Figure 1:
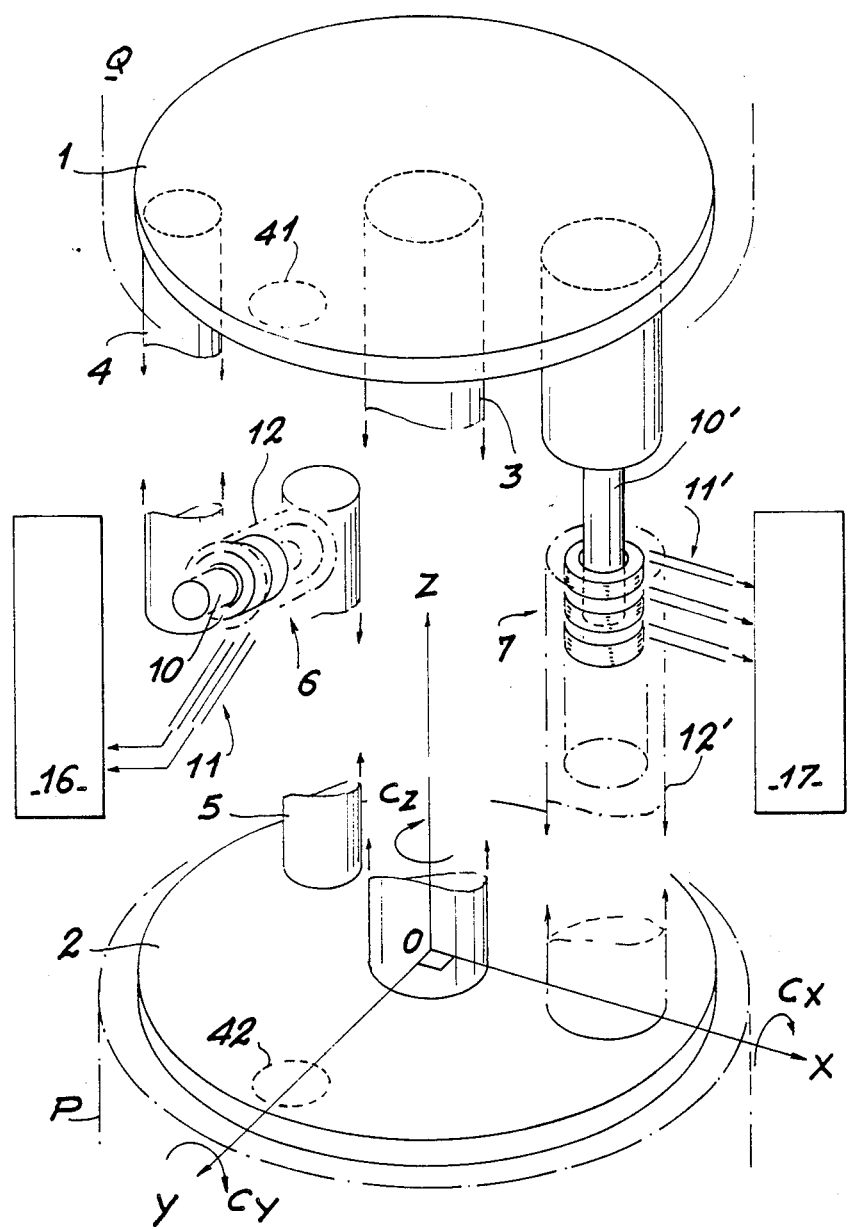

United States Patent [19]
Lerat

[11] Patent Number: 4,879,913
[45] Date of Patent: Nov. 14, 1989

[54] TRANSDUCER FOR BENDING AND TWISTING MOMENTS

[75] Inventor: Bernard Lerat, Thones, France

[73] Assignee: Commissariat A L'Energie Atomique, Paris, France

[21] Appl. No.: 168,403

[22] Filed: Mar. 15, 1988

[30] Foreign Application Priority Data

Mar. 19, 1987 [FR] France .................. 87 03820

[51] Int. Cl.⁴ .............................. G01L 5/16
[52] U.S. Cl. ..................... 73/862.04; 73/862.06
[58] Field of Search ......... 73/862.04, 862.05, 862.06, 73/147

[56] References Cited

U.S. PATENT DOCUMENTS

| | | |
|---|---|---|
| 2,866,333 | 12/1958 | Dudenhausen . |
| 3,434,342 | 3/1969 | Kazmarek . |
| 3,584,505 | 6/1971 | Seligmann .................. 73/862.06 |
| 4,472,976 | 9/1984 | Bonfils .................. 73/862.04 X |

FOREIGN PATENT DOCUMENTS

| | | |
|---|---|---|
| 2127466 | 12/1972 | Fed. Rep. of Germany . |
| 2226655 | 11/1974 | France . |
| 2490342 | 3/1982 | France . |
| 0032780 | 3/1978 | Japan .................. 73/862.04 |

*Primary Examiner*—Charles A. Ruehl
*Attorney, Agent, or Firm*—Nutter, McClennen & Fish

[57] ABSTRACT

A transducer of bending and twisting moments exerted between two mechanical assemblies for the measuring of machining forces comprises two plates connected by a flexible beam. Devices for measuring the desired moments are connected to each of these plates, in such a way that their informations are unlinked. Advantageously, these devices can be prestressed in compression by means of stacks of cupped washers.

8 Claims, 4 Drawing Sheets

TRANSDUCER FOR BENDING AND TWISTING MOMENTS

DESCRIPTION

The present invention relates to a transducer making it possible to measure the bending and twisting moments exerted between two mechanical assemblies.

Numerous transducers are known which make it possible to measure the different force components. They are generally constituted by an isostatic assembly of beams placed between the two mechanical assemblies and which take up all the forces or stresses. In a conventional construction, strain gauges are placed on these beams and their informations are combined with the aid of electric circuits and digital calculations by computer in order to deduce therefrom the force components. Couplings between the informations from these different beams are obviously inevitable. Thus, this leads to complication in the equipment, although certain force components are not required or are negligible.

Thus, the object of the present invention is a transducer not having the aforementioned complexity and which only supplies the value of the bending and twisting moments at the junction of two mechanical assemblies.

The transducer comprises a connecting structure for the two mechanical assemblies which takes up the forces and devices each measuring one of the desired components. These informations are not then coupled to one another, which considerably simplifies the conversion equipment.

In a first version of the invention, these measuring devices are displacement transducers. This transducer is relatively flexible, but this is not advantageous for certain applications. In other versions of the transducer, the measuring devices are bars or rods equipped with force measuring means, e.g. piezoelectric means or strain gauges. The bars may or may not be prestressed. In these various versions of the invention, the devices are subject to tension and compression stress.

More specifically, the present invention relates to a transducer for the bending and twisting moments exerted between two mechanical assemblies characterized in that it comprises, coupled in each case to one of the assemblies, two substantially parallel rigid plates, a flexible beam connecting the two rigid plates and substantially perpendicular thereto, a first displacement or force measuring device characterizing the twisting moment of the beam and a second force or displacement measuring device characterizing one of the bending moments of the beam, the measuring devices being connected to the two rigid plates.

Each of these devices can comprise two separate parts, whereof each is connected to one of the rigid plates and whereof the relative displacement is measured. Each device can also comprise a deformable element connected to each of the rigid plates by non-deformable bars.

In order to prevent the appearance of parasitic stresses in the devices, it is possible to connect the measuring devices to each of the rigid plates by means of ball joints.

Finally, according to an advantageous arrangement, the measuring devices can be prestressed in such a way as to measure a stress which always retains the same sign, no matter what the direction of the forces applied between the two mechanical assemblies.

Figure 2:
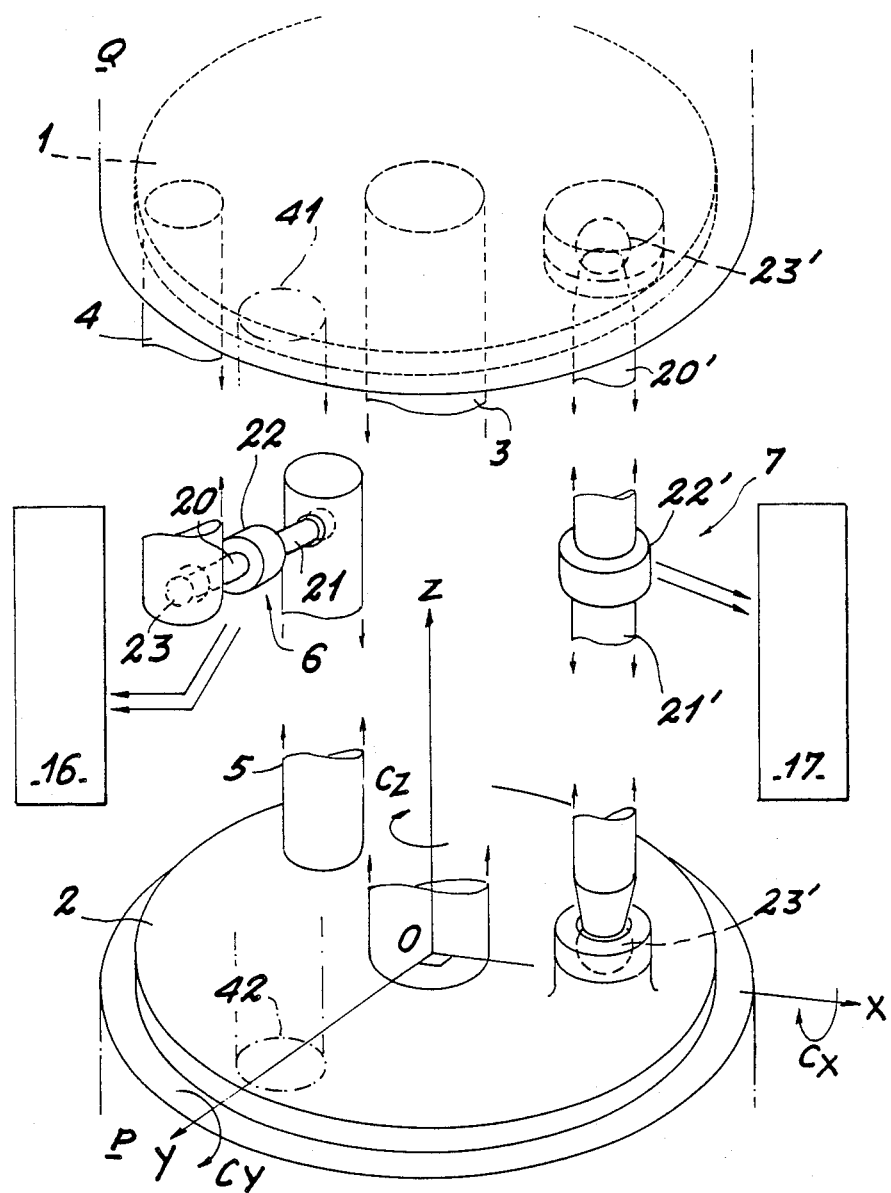
Figure 3:
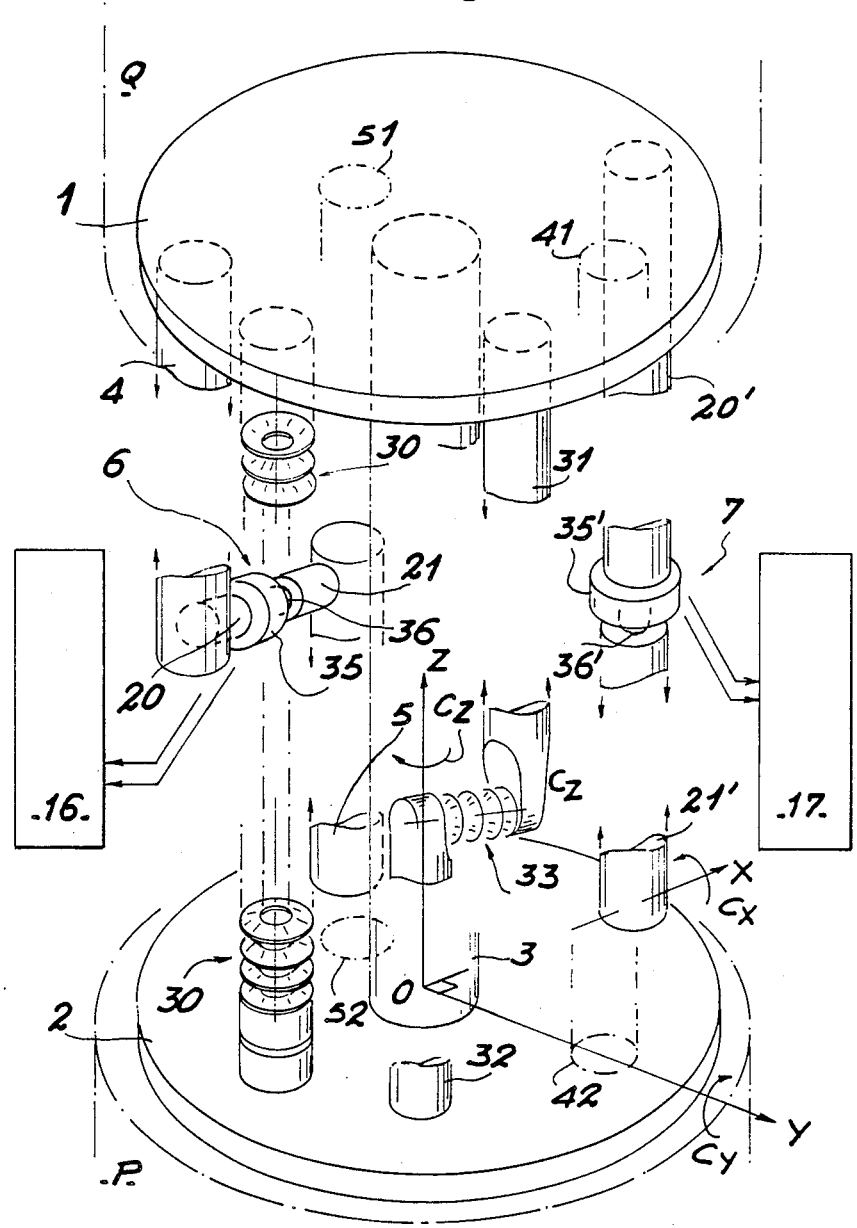
Figure 4:
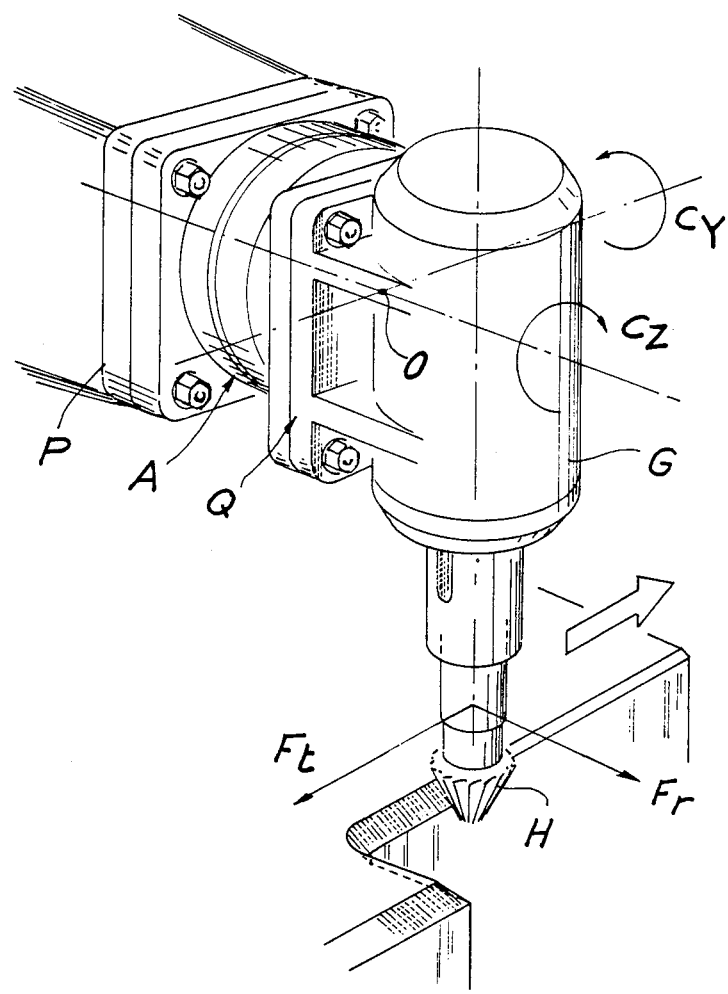

The invention is described in greater detail hereinafter relative to non-limitative embodiments and the attached drawings, wherein show:

FIG. 1 A first embodiment of the invention.
FIG. 2 A second embodiment of the invention.
FIG. 3 A third embodiment of the invention.
FIG. 4 A particular application of the invention.
FIGS. 1 to 3 are exploded views permitting an easier understanding of the invention.

With the aid of FIG. 1, reference will firstly be made to the common parts to the different embodiments proposed. The transducer firstly comprises two rigid plates 1, 2, respectively connected to two mechanical assemblies P, Q between which is exerted a twisting moment CZ about an axis Z and a bending moment CY about an axis Y. Rigid plates 1 and 2 are interconnected by a deformable flexible beam 3, which is shown in circular form here, but which could be constituted by a random profile and which can e.g. also be conical. Each of the plates 1 and 2 is provided on its periphery with a rigid bar 4 and 5 extending in the direction of the other plate and which stops at approximately mid-distance. There is a gap between the two bars 4, 5, between which is installed a device 6 parallel to the rigid plates 1, 2 and which measures the twisting moment CZ between the rigid plates 1, 2. Between the two rigid plates 1, 2 is also installed a device 7 parallel to the flexible beam 3 which measures the bending moment CY tending to move together or away from one another the points of the rigid plates 1 and 2 where device 7 is connected.

Beam 3, perpendicular to the rigid plates 1, 2, is dimensioned in such a way as to offer little resistance to the moments CY and CZ, whilst being rigid with respect to the other force components applied, i.e. to the normal and shear strains, as well as possibly to the bending moment CX exerted perpendicular to CY.

The originality of the first embodiment of the invention is that the various measuring devices incorporate displacement transducers formed from two separate parts, namely a magnetic core 10 or 10' connected to one of the bars 4 for device 6 and to one of the rigid plates 1 for device 7, as well as supports 12, 12' each containing one or more induction coils 11, 11' connected respectively to the second plate 2 and to the second bar 5, so that the end of the magnetic cores 10, 10' penetrates the coils 11, 11'.

The electric currents flowing through coils 11, 11' are produced and measured respectively by assemblies 16 in the case of the twisting moment measuring device 6 and 17 for the bending moment measuring device 7.

Assemblies 16 and 17 each consist of a power source (or a single source for both assemblies) and a conventional bridge circuit (not shown) of the type customarily used in strain gauges, e.g. a Wheatstone bridge, in which voltage differences through devices 6 and 7 are respectively measured.

Thus, only beam 3 takes up the forces exerted between the two mechanical assemblies P and Q. Its deformation acts on devices 6 and 7. The variation of the position of magnetic cores 10, 10' in coils 11, 11' leads to a modification of the characteristics of the currents induced and which pass through the latter. Thus, it is easily possible to obtain informations concerning the displacements produced by the twisting moment CZ and the bending moment CY.

It is immediately apparent that the application of one of the moments CY or CZ only varies the penetration of magnetic core 10 or 10' into coils 11 or 11' for a single measuring device. Its only action on the other measuring device is to vary the radial position of the magnetic core 10' or 10 in coils 11' or 11. However, this radial position modification is inadequate to lead to a significant modification of the current induced in said other measuring devices. It can therefore be considered that the measuring devices function in an uncoupled or unlinked manner and consequently supply informations which can be independently processed.

Without passing beyond the scope of the invention, it would also be possible to introduce a device identical to 7 and angularly displaced by 90° for measuring the bending moment CX. Such a position is represented by the connecting lines 41, 42 of such a device to the rigid plates 1 and 2. It has not been shown here because it can be possibly constructed in exactly the same way as device 7. The measurements of the deformations of the three devices remain unlinked.

The major disadvantage of this inventive embodiment, in the case of its application to machining, is that the transducer is relatively flexible or pliable and can therefore undergo deformations considered to be excessive for the quality of the operation performed. It is to obviate this shortcoming that the following embodiments have been conceived.

In FIG. 2, devices 6 or 7 are now in each case constituted by a pair of bars 20, 21 or 20', 21', each connected respectively to one of the bars 4 and 5 or to one of the rigid plates 1 and 2, whilst being interconnected by a sensitive member 22 or 22' making it possible to measure the tensile or compressive forces undergone by bars 20, 21 or 20', 21' and which can e.g. be a piezoelectric detector. Bars 20 and 21 (or 20' and 21') could be replaced by an equivalent device constituted by a single bar on which strain gauges are installed, but this construction is not shown here.

Thus, the devices 6 and 7 shown in FIG. 2 give a much greater rigidity to the transducer. The disengagement between the informations of the different devices 6 and 7 is retained in this embodiment.

However, it is preferable to take action against the parasitic stresses or forces which could be produced during the assembly of bars 20 and 21 or 20' and 21' on the rigid plates 1, 2. For this purpose, the ends of bars 20, 21 or 20', 21' by which the connection to bars 4 and 5 or rigid plates 1 and 2 takes place are equipped with ball joints 23 or 23', which do not modify the behaviour of devices 6 and 7 in tension-compression.

Here again, it is possible to place between the connection lines 41 and 42 a device making it possible to measure the bending moment CX under the same conditions as in FIG. 1 and which can be like the device making it possible to measure the bending moment CY designated 7 in FIG. 2.

FIG. 3 shows an embodiment constituting an improvement which can be made to that of FIG. 2 and according to which the devices 6 and 7 are prestressed by elastic means. For certain applications where the bending and twisting moments CZ and CY can change sense, this arrangement makes it possible to only measure the deformation values of the same sign on devices 6 and 7 and to e.g. only use compressive stress measuring devices. These values can then be corrected by a constant, known factor in order to eliminate the influence of the prestressing.

The prestressing of device 7 is e.g. ensured by a stack of cupped washers, whose axis is parallel to the axis of the flexible beam, located between the two rigid plates 1, 2 in a position opposite to device 7 with respect to the flexible beam 3.

Device 6 is prestressed in the same way with the aid of a stack of cupped washers 33 located in a plane mid-distance from the rigid plates 1, 2 between two bars 31, 32 respectively connected to plates 1, 2. This stack has an axis perpendicular to the axis of beam 3 and is diametrically opposite to device 6. Thus, stack 30 produces a prestressing moment, which here leads to a compression of device 7, whilst stack 33 produces a twisting prestressing moment of flexible beam 3, which leads to a compression of device 6. This embodiment has two advantages.

Firstly, the presence of a ball joint mechanism, like that shown in FIG. 2 and which is obligatory for tension-compression transducers rigidly connected to bars 20, 21 or 20', 21' has no function here, because in the case of compressive prestressing, the element working in tension-compression 22 or 22' can be replaced by an element 35 or 35' working only in compression bearing against only one of the bars 20 or 20' and entering into contact with the other bar 21 or 21' via a surface which can be spherical 36 or 36', so as to adapt to ends of bars 20, 21 or 20', 21', which are not parallel. It is therefore possible to rigidly fix by tailing in bars 20, 21 or 20', 21' to the respective bars 4 and 5 or to their respective rigid plates 1 and 2. This leads to a considerable simplification of the construction of the transducer.

The prestressed transducer according to the invention is relatively insensitive to temperature changes, so that expansions or contractions, particularly of the rigid plates 1, 2 and the flexible beam 3 are accompanied by equivalent deformations of stacks 30, 33, so that the prestressing value of devices 7 and 6 is not altered.

Here again, it is possible to introduce a device for measuring the bending moment CX between the connection lines 41, 42, angularly displaced by 90° with respect to device 7 measuring the orthogonal bending moment CY and which can be like the latter. It can be prestressed by means of a stack of cupped washers, not shown here and positioned between the connection lines 51, 52 with two rigid plates 1, 2, the axis of said stack being parallel to the axis of the flexible beam 3 and diametrically opposite to the device for measuring the bending moment CX. The flexible bean 3 must obviously then have a limited bending rigidity about axis X.

The transducer is then overall very rigid, the construction of FIG. 3 must be looked upon as of particular interest.

For all the embodiments described here, the transducer according to the invention permits simple and good quality measurements with the aid of simple equipment.

A preferred application of such a transducer is in machining. FIG. 4 shows that in the case of deburring beads or chamfering with the aid of robots equipped with a cutter G, the radial FR and tangential FT forces exerted on tool H respectively lead to a bending moment CY and a twisting moment CZ at the end of the arm of the robot, whereas the other force components are much smaller in this case. If the mechanical assemblies P and Q respectively represent the arm of the robot and its gripper to which the cutter is fixed, the inventive transducer A can be used for interactively regulating the cutting parameters during machining.

In the envisaged constructions, plates 1 and 2 have a much larger diameter than the length of the flexible beam 3 and the moment measuring devices 6, 7. Thus, the transducer is much more compact and rigid than would be apparent from the drawings, because the latter have been drawn so as to ensure maximum clarity and said transducer would have the proportions of a pellet.

I claim:

1. Transducer for bending and twisting moments exerted between two mechanical assemblies (P, Q) comprising two rigid and substantially parallel plates (1, 2), each plate being coupled to one respective assembly, a flexible beam (3) interconnecting the two rigid plates and substantially perpendicular thereto and transmitting the efforts exerted between the two assemblies, a first device (6) for measuring the displacement or force characterizing the twisting moment (CZ) of the beam and a second device (7) for measuring the displacement or force characterizing one of the bending moments (CY) of the beam, the measuring devices being connected to each of the rigid plates (1, 2) and the second device (7) being substantially rectilinear and parallel to beam (3) and at least one of the displacement or force measuring devices (6, 7) being constituted by a sensitive element (22, 35) connected to each of the rigid plates by bars (20, 21), the bars being connected to each of the rigid plates (1, 2) via ball joints (23, 23').

2. Transducer according to claim 1 characterized in that it comprises a third displacement or force measuring device (41, 42) connected to each of the two rigid plates (1, 2) characterizing the bending moment (CX) orthogonal to the bending moment (CY) characterized by the second displacement or force measuring device (7).

3. Transducer for bending and twisting moments exerted between two mechanical assemblies (P, Q) comprising two rigid and substantially parallel plates (1, 2), each plate being coupled to one respective assembly, a flexible beam (3) interconnecting the two rigid plates and substantially perpendicular thereto and transmitting the efforts exerted between the two assemblies, a first device (6) for measuring the displacement or force characterizing the twisting moment (CZ) of the beam and a second device (7) for measuring the displacement or force characterizing one of the bending moments (CY) of the beam, the measuring devices being connected to each of the rigid plates (1, 2) and the second device (7) being substantially rectilinear and parallel to beam (3) and at least one of the displacement or force measuring devices (6, 7) being constituted by a sensitive element (22, 35) connected to each of the rigid plates by bars (20, 21) and at least one of the force measuring devices (6, 7) being prestressed, so that the tension-compression stresses undergone by bars (20, 21) and the sensitive element (35) are always in the same direction.

4. Transducer according to claim 3, characterized in that it comprises a compressed structure (30, 33) for prestressing said displacement or force measuring device, the flexible beam (3) being located between said structure (30, 33) and said displacement or force measuring device.

5. Transducer according to claim 4, characterized in that the compressed structure (30, 33) is formed by a stack of cupped elastic washers.

6. Transducer according to claim 5, characterized in that the stresses undergone by bars (20, 21) are always compressive stresses and in that the sensitive element (36) bears against one of the bars (20) and enters into contact with the other bar (21) by a quasi-punctiform surface (36).

7. Transducer according to claim 3 characterized in that it comprises a third displacement or force measuring device (41, 42) connected to each of the two rigid plates (1, 2) characterizing the bending moment (CX) orthogonal to the bending moment (CY) characterized by the second displacement or force measuring device (7).

8. A transducer for bending and twisting moments exerted between two mechanical assemblies (P, Q) comprising two rigid and substantially parallel plates (1, 2), a flexible beam (3) interconnecting the two rigid plates and substantially perpendicular thereto and transmitting the efforts exerted between the two assemblies, a first device (6) for measuring the displacement or force characterizing the twisting moment (CZ) of the beam and a second device (7) for measuring the displacement or force characterizing one of the bending moments (CY) of the beam, the measuring devices being connected to each of the rigid plates (1, 2) and the second device (7) being substantially rectilinear and parallel to beam (3), and a third displacement or force measuring device (41, 42) connected to each of the two rigid plates (1, 2), characterizing the bending moment (CX) orthogonal to the bending moment (CY) characterized by the second device (7).

* * * * *